Sept. 29, 1970    R. L. WHITE    3,530,730
POWER CONVERSION
Filed Jan. 6, 1969      5 Sheets-Sheet 1
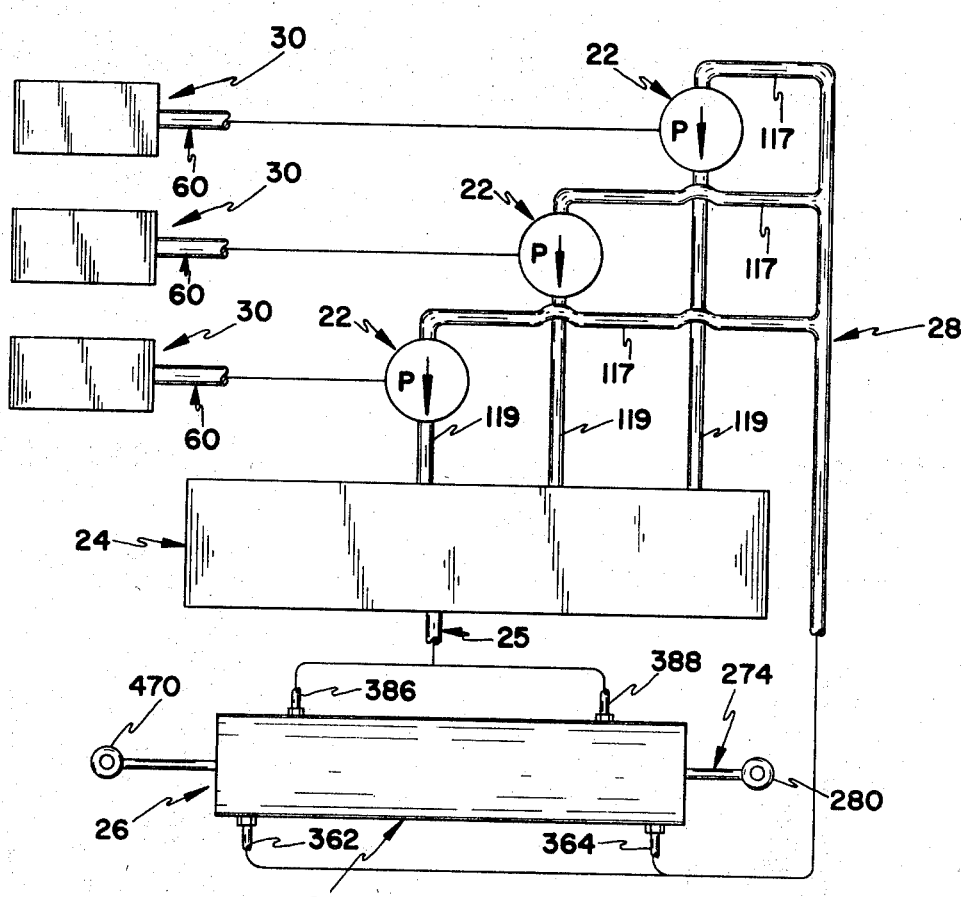
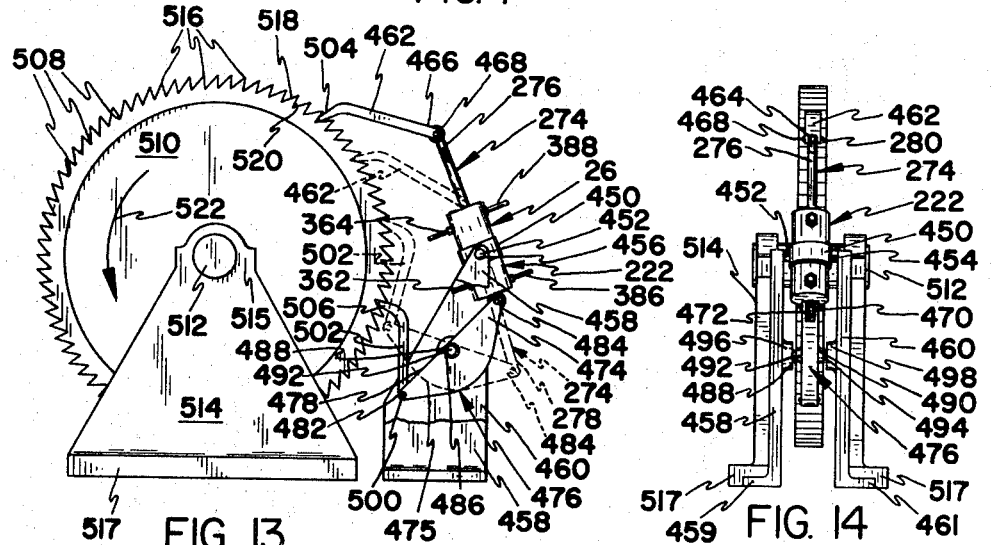
INVENTOR.
ROBERT L. WHITE
BY
*Lynn G. Foster*
ATTORNEY

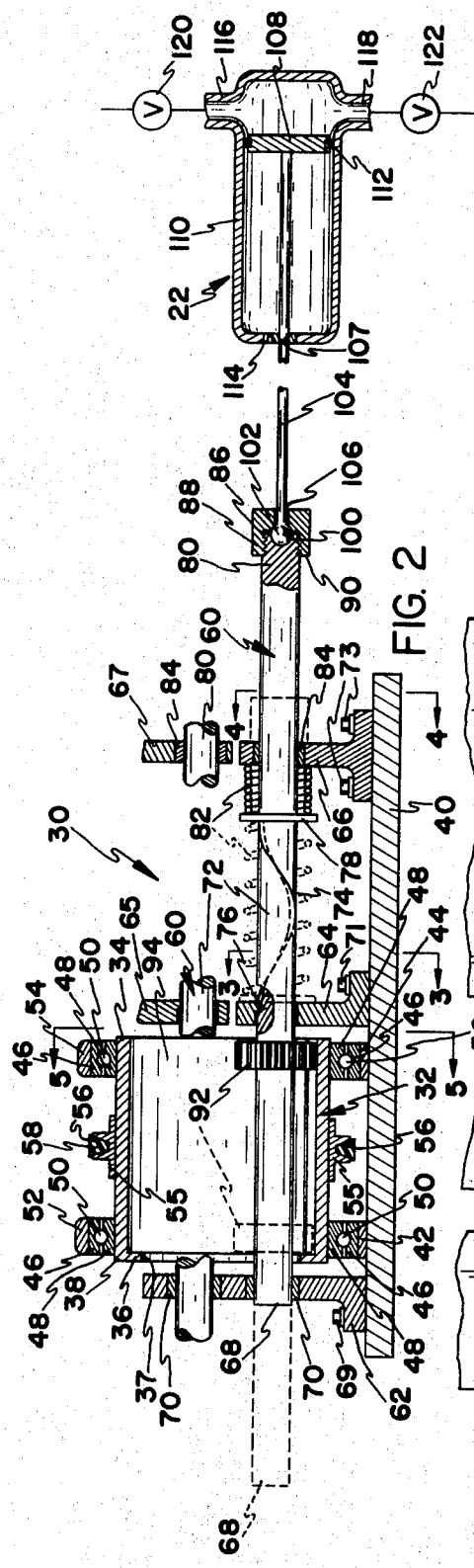
FIG. 2
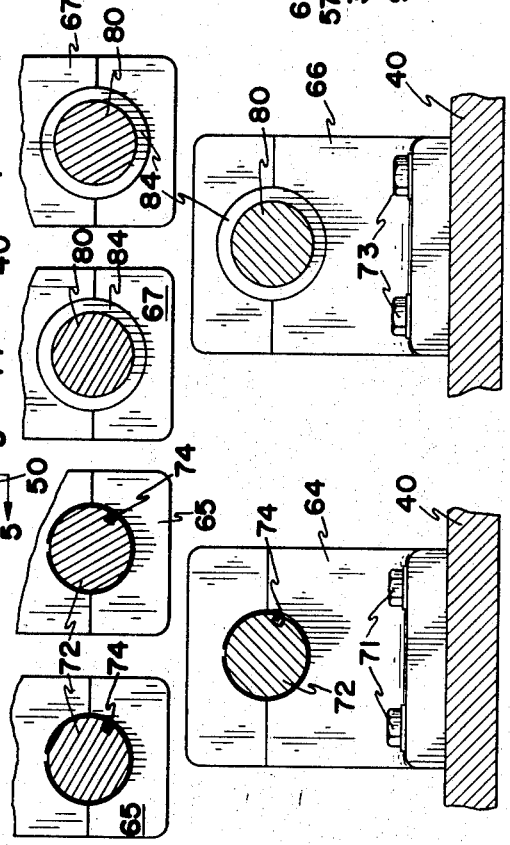
FIG. 3
FIG. 4
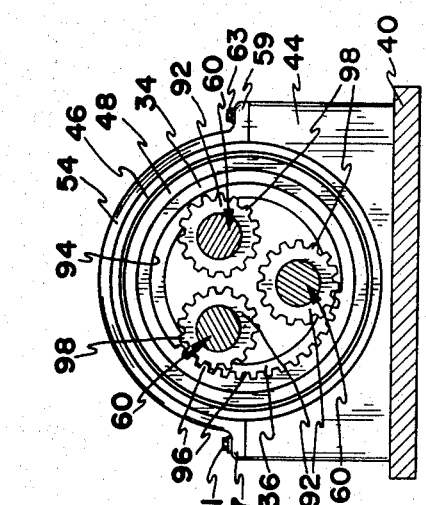
FIG. 5
INVENTOR.
ROBERT L. WHITE
BY
ATTORNEY

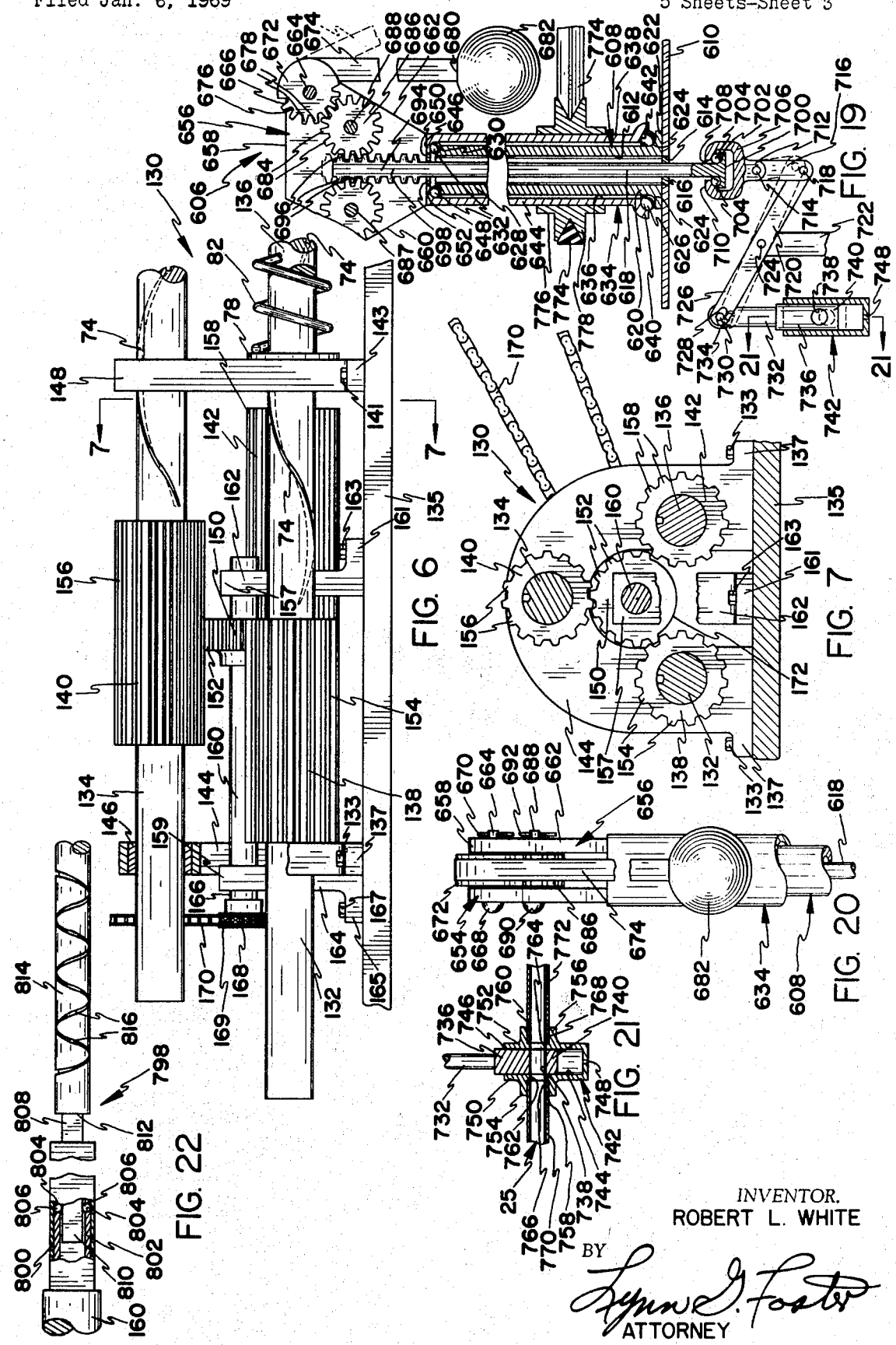

Sept. 29, 1970 R. L. WHITE 3,530,730
POWER CONVERSION
Filed Jan. 6, 1969 5 Sheets-Sheet 4
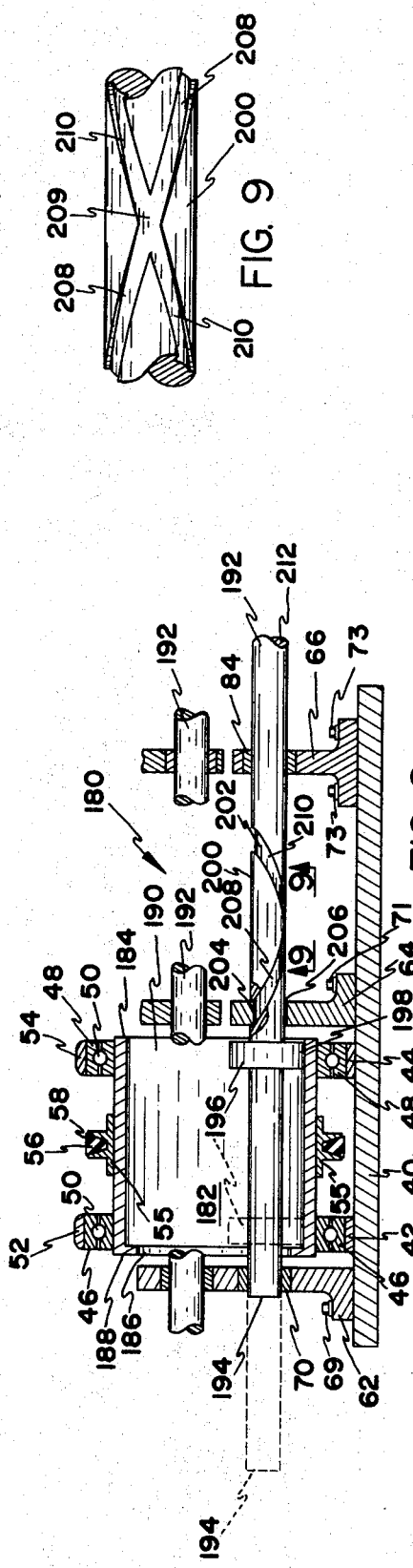
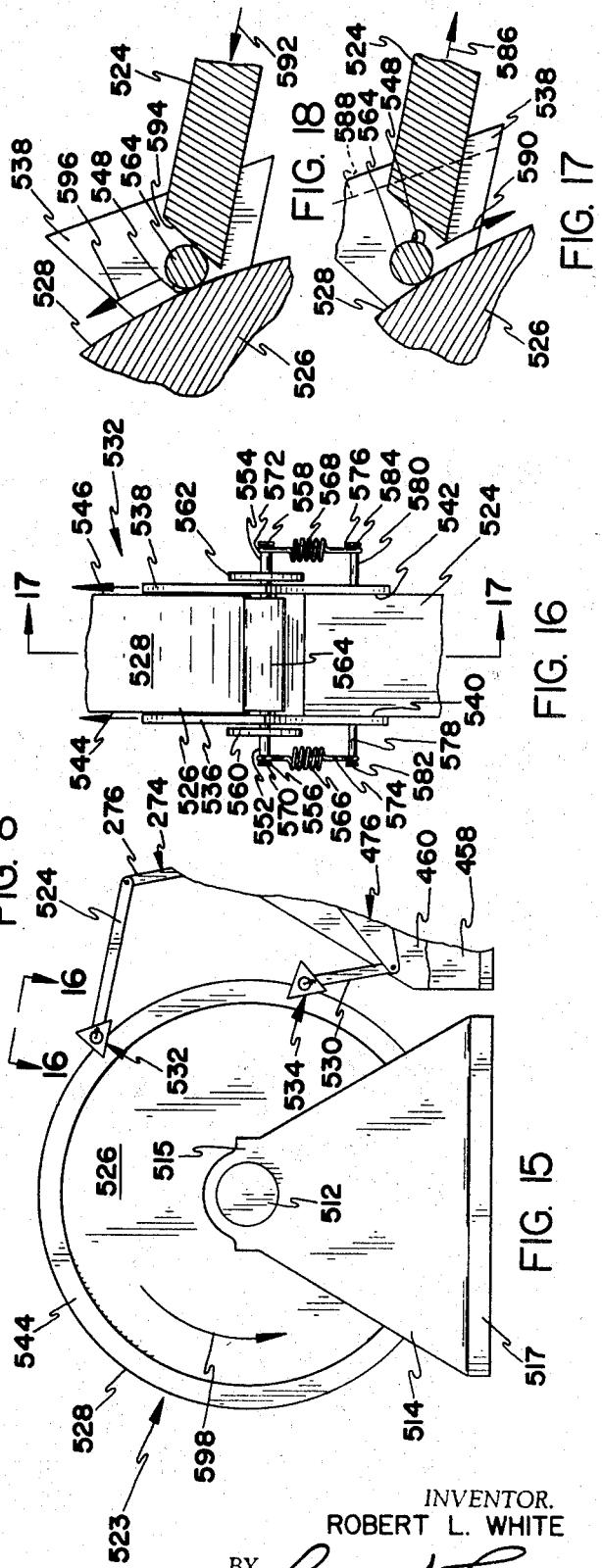
INVENTOR.
ROBERT L. WHITE
BY
*Lynn T. Foster*
ATTORNEY

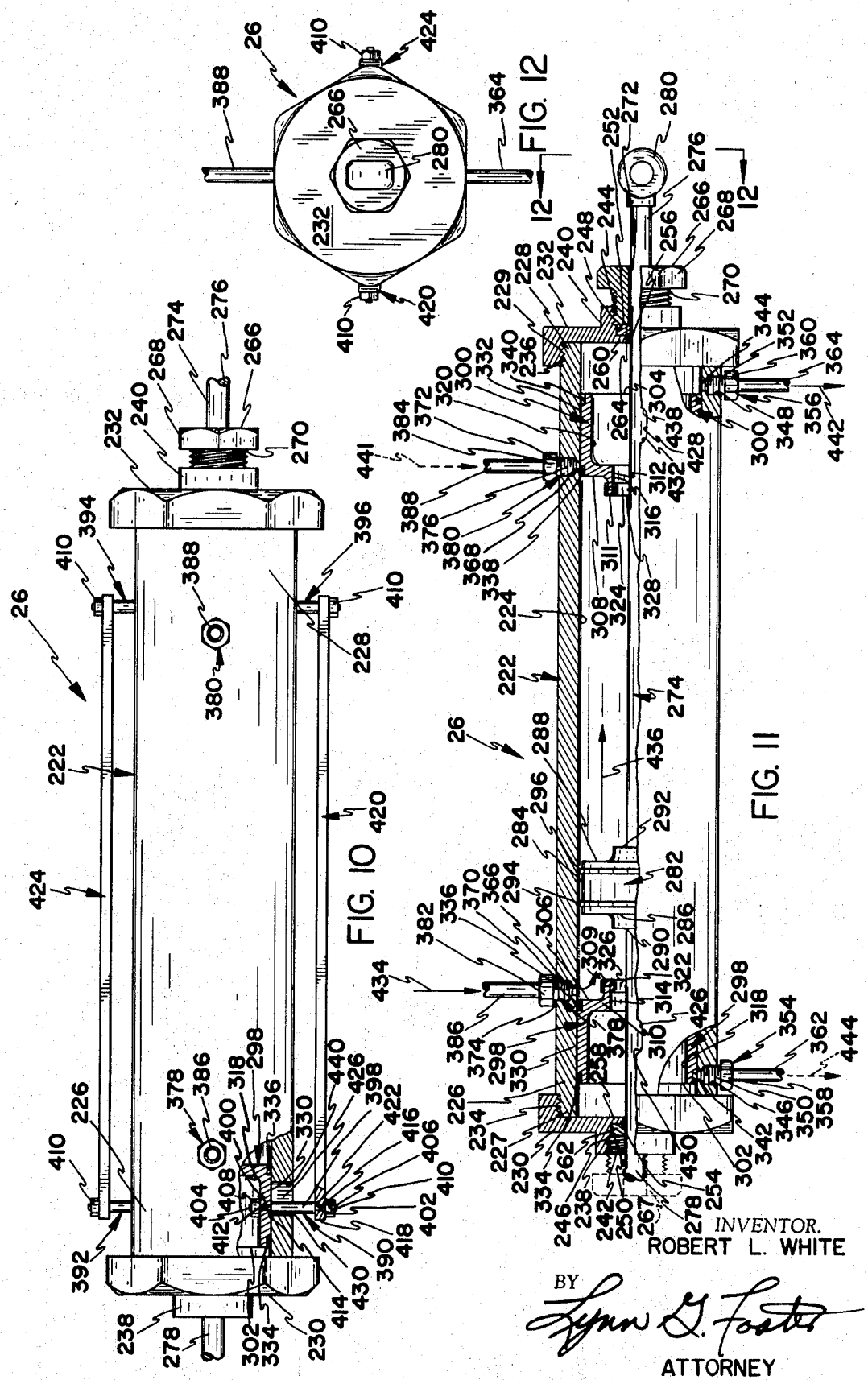

United States Patent Office 3,530,730
Patented Sept. 29, 1970

3,530,730
POWER CONVERSION
Robert L. White, 304 East 7200 South,
Salt Lake City, Utah 84121
Filed Jan. 6, 1969, Ser. No. 789,266
Int. Cl. F16h 25/12
U.S. Cl. 74—23                               9 Claims

ABSTRACT OF THE DISCLOSURE

A power conversion system, the presently preferred apparatus featuring a transmission comprising a primary driving wheel which, seriatim rotationally displaces a plurality of shafts through a predetermined distance during part of a cycle, each shaft axially reciprocating first in one direction during the rotational displacement and, when the rotational displacement terminates, in the opposite direction thereby returning the shaft to the initial position. A fluid pump, actuated by the transmission, develops increased pressure in a fluid upon which it acts, and the fluid under pressure is communicated to inlet ports of a fluid motor. The fluid motor comprises a reciprocable shaft upon which a spool is integrally mounted in fluid-sealed relation within a cylinder housing which is cyclically opened at one end and closed at the other and then vice versa to cause the fluid to exert pressure first on one face of the spool and thereby reciprocally displace the spool and integral shaft in one direction and then upon the opposite face to oppositely displace the spool and shaft. The ends of the reciprocable flud motor shaft drive other machinery, e.g. each can be pivotally connected to a pawl or roller which engages a given circumferential location on a large wheel which rotates in only one direction responsive to the reciprocating movement of the fluid motor shaft.

---

The present invention relates to a power conversion system and more particularly to novel apparatus for selectively converting rotating power to reciprocating power and vice versa.

The present invention comprises a novel motor and power conversion system which uses energy from a prime mover to operate an improved transmission which converts the rotating motion to reciprocal motion. The reciprocal motion can be used in cooperation with a conventional fluid pump to increase pressure. A fluid motor can be acted upon by the fluid pressure to create reciprocal motion which is used to perform work, e.g. rotation of a drive wheel adjacent the fluid motor.

Accordingly, it a primary object of this invention to provide novel apparatus for conversion of motion between reciprocal linear translation and rotation.

It is another primary object of the present invention to provide novel power conversion apparatus which accommodates conversion of mechanical energy from one form to another and conversion mechanical energy to fluid pressure and vice versa, to accomplish work.

It is another significant object of the present invention to provide a novel transmission apparatus accommodating rapid efficient conversion of rotary mechanical motion to reciprocal mechanical motion.

Another and no less important object of the present invention is to provide an improved fluid motor which is self-starting and which automatically and continuously converts fluid pressure to reciprocal mechanical motion.

One still further object of the present invention is the provision of unique structure accommodating continuous rotation of a drive wheel in a single direction.

These and other objects and features of the present invention will become more fully apparent from the following description and appended claims taken in conjunction with the accompanying drawings wherein:

FIG. 1 is a schematic representation of one entire power conversion system according to this invention, generally schematically illustrating the connection of the respective members;

FIG. 2 is a side elevation of one presently preferred transmission embodiment, which may comprise one portion of the system of FIG. 1, shown partially in cross-section with portions broken away for purposes of clarity;

FIGS. 3–5 are cross-sections taken along lines 3—3, 4—4 and 5—5, respectively, of FIG. 2;

FIG. 6 is a side elevation of another presently preferred transmission embodiment, shown partially in cross-section and with portions broken away for clarity;

FIG. 7 is a cross-section taken along lines 7—7 of FIG. 6 with portions broken away for ease of illustration;

FIG. 8 is a side elevation of another transmission embodiment shown partially in cross-section and with parts broken away for ease of illustration;

FIG. 9 is a fragmentary bottom plan view taken along lines 9—9 of FIG. 8;

FIG. 10 is a plan view of a presently preferred fluid motor, which can be used with the system of FIG. 1, with portions broken away to reveal internal structure;

FIG. 11 is a side elevation in partial cross-section of the fluid motor embodiment of FIG. 10;

FIG. 12 is an end elevational view taken along line 12—12 of FIG. 11;

FIG. 13 is a schematic illustration of conversion structure used with the fluid motor of FIG. 11 to convert reciprocal motion to rotary wheel motion;

FIG. 14 is an end elevational view of the embodiment of FIG. 13 as viewed from the right-hand side;

FIG. 15 schematically illustrates another conversion structure embodiment for use with the fluid motor of FIG. 14;

FIG. 16 is a fragmentary plan view taken along lines 16—16 of FIG. 15;

FIG. 17 is a fragmentary cross-section taken along lines 17—17 of FIG. 16 showing a drive roller in the wheel advancing position;

FIG. 18 schematically illustrates the structure of FIG. 17 in the retracting position;

FIG. 19 is an elevation mostly in cross-section which schematically illustrates a governor which may be used with either of the wheels shown in FIGS. 13 and 15;

FIG. 20 is a fragmentary side elevation of the governor of FIG. 19;

FIG. 21 is a cross-section taken along lines 21—21 of FIG. 19; and

FIG. 22 is a fragmentary side elevation of another shaft embodiment which may be used with the transmission embodiment of FIG. 6, the shaft having portions broken away to reveal inner parts.

FIG. 1 illustrates one way in which portions of this invention may be combined to convert rotational mechanical displacement to reciprocal mechanical displacement and vice versa, for the purposes of performing work. In FIG. 1, each of a plurality of transmissions, generally designated 30, have a reciprocating shaft 60 which drives an adjacent fluid pump, generally designated 22. Each pump displaces air or other fluid by pressure through lines 119 to a reservoir 24. The fluid under pressure from the reservoir 24 is communicated through lines 25, 386 and 382 to an air motor, generally designated 26. The air motor converts the elevated air pressure to reciprocal mechanical displacement in shaft 274. Air exhausting from the air motor 26 through tubes 362 and 364 is communicated through conduit or pipe 28 and auxiliary tubing 117 to the fluid pump 22. To more fully understand the structure and operation of each of the respective structural members of FIG. 1, the transmission, pumps and fluid motor will hereinafter be more fully described.

Attention is directed to FIG. 2 wherein one presently preferred embodiment of the transmission is illustrated. The transmission 30 principally comprises a substantially hollow driving cylinder 32 which is completely open at the leading end 34 and which presents an annular inwardly directed shoulder 36 defining an opening 37 having a reduced diameter at the end 38 of the cylinder 32. The driving cylinder 32 is carried upon a substantially rigid base 40 by lower bearing retainers 42 and 44, bearing races 46 and 48 being disposed around substantially the entire circumference of the cylinder 32. A plurality of balls 50 situated in a conventional manner within the bearing races 46 and 48 accommodate satisfactory axial rotation of the driving cylinder 32.

Upper bearing retainers 52 and 54 likewise cooperate with the defined bearing structure to prevent lateral displacement of the driving cylinder 32 while simultaneously accommodating rotational movement. As best shown in FIG. 5, the upper bearing retainers 52 and 54 are U-shaped and sized to fit snugly around the outer bearing race 46. The outward flange ends 57 and 59 of the retainers 52 and 54 are provided with bores (not shown) which are in axial alignment with similarly sized threaded bores (not shown) in the lower bearing retainers 42 and 44. Threaded bolts 61 and 63 are screwed into the threaded bores to secure the upper and lower bearing retainers tightly together.

An annular collar 55 is integrally connected such as by welding around the external circumference of the driving cylinder 32 in a location essentially one-half the axial length of the driving cylinder 32. The annular collar 55 presents an outwardly opening V-shaped channel 56 which is adapted to receive a driving belt 58 such as a V-belt or the like. The annular collar 55, channel 56 and driving cylinder 32 cooperate to form a pulley which is rotated by the V-belt 58. The V-belt 58 is driven by a conventional prime mover (not shown) and moves the cylinder 32 within the described bearing structure.

Three substantially identical shafts 60 are eccentrically disposed within and extend through the open ends 34 and 38 of the driving cylinder 32 (FIG. 5). Each shaft 60 is carried by a rear shaft support 62, a central shaft support 64 or 65 and a forward shaft support 66 or 67. Each of the shaft supports 62, 64 and 66 is respectively secured in a conventional way to the rigid base 40 by bolts 69, 71 and 73. The upper shaft supports 65 and 67 are secured to conventional overhead support structure (not shown). The rear shaft support 62 which carries the trailing end 68 of the shaft 60 is provided with bearings 700 which allow the shaft 60 to be displaced both rotationally and axially.

The intermediate portion 72 of each shaft 60 is provided with a keyway 74 helically disposed in the periphery of the intermediate portion 72 and opening to the exterior of the shaft 60. The central shaft support 64 which is adapted to receive the intermediate portion 72 of the shaft 60 accommodates both axial and rotational displacement thereof, and is provided with a downwardly projecting, radially inwardly directed tongue, guide or key 76. The keyway 74 is adapted to receive the key 76, and these parts are sized so that the key 76 guides the axial movement of the associated shaft 60 back and forth along a path defined by the keyway 74.

A spring-engaging bearing plate 78 is integrally attached to each shaft 60 at the intermediate portion 72 of the shaft 60. The bearing plate 78 abuts one end of a compression spring 82 confining the spring 82 between the plate 78 and the left face of support 66 or 67.

It should be noted that the compression spring 82 continuously biases the shaft 60 toward its most retracted position illustrated in dotted lines in FIG. 2.

The forward central shaft supports 66 and 67 are respectively also provided with bearings 84 which accommodate both rotational and axial displacement of the shaft 60.

The leading end 80 of each shaft 60 is provided with an exteriorly threaded, reduced diameter portion 86 which threadedly engages the threaded blind bore disposed within cap 88. The cap 88 has a larger diametral dimension than the shaft 60 so as to provide an annular surface 90 at the trailing end of the cap 88.

Each shaft 60 is provided with a gear 92 which is splined or otherwise non-rotatably fixed to the shaft 60 at a location so as to always be disposed within the interior of the driving cylinder 32 adjacent the internal peripheral surface 94 thereof. The internal surface 94 of the driving cylinder 32 is substantially smooth over essentially two thirds of its internal circumference. The remaining one third of the internal circumference is provided with gear teeth 96 (FIG. 5) which are adapted to mesh with the teeth 98 on the gear 92. The diameter of the smooth surface 94 is about equal to or slightly larger than the diameter at the root of teeth 98. Thus, as the driving cylinder 32 rotates, the three gears 92 and associated shafts 60 will respectively rotate in a direction generally the same as the direction of rotation of the driving cylinder 32 through approximately one-third of each revolution of the cylinder 32, i.e. during the period of time when the teeth of each gear 92 are meshed with the teeth 96 of the cylinder 32. Each shaft 60 and associated gear 92 will at the same time shift between the dotted and solid line positions of FIG. 2, the key 76, adjacent each shaft 60, because of the relation thereof with a keyway 74, will cause the shaft 60 to be axially displaced against the bias of the compression spring 82 along a path defined by the keyway throughout the duration of the rotation of the adjacent gear 92 when meshed with teeth 96. After initial engagement of one gear 92 with teeth 96 and following rotation of cylinder 32 through approximately 120°, the gear teeth 98 on the one gear 92 will become disengaged from the gear teeth 96 of the cylinder so that the gear is no longer forced to rotate and the associated shaft 60 is acted upon only by the bias of the then-compressed spring 82. The spring 82, therefore, returns the shaft 60 from the solid line to the dotted line position of FIG. 2.

The leading end 80 of each shaft 60 is provided with a socket 100 which cooperates with a ball 102 to form a ball-socket joint enclosed by cap 88. The ball 102 is integrally disposed at the distal end of a piston rod 104, the piston rod 104 being loosely disposed through the cap 88 at aperture 106.

Each piston rod 104 is integral at the proximal end thereof with a piston 108 carried within a pump housing or cylinder 110, the rod 104 extending from the housing 110 through aperture 107. Each piston 108 and associated cylinder 110 are in sealed relation by reason of an O-ring 112 disposed in a groove at the circumferential periphery of the piston 108. A port 114 accommodates free passage of air into and out of the cylinder 110 at the back side of the piston 108 as the piston 108 is axially displaced fore and aft.

Each cylinder 110 is provided with an intake port 116 and outlet port 118 which accommodate ingress and egress of fluid, the flow of the fluid being determined by the positions of one-way valves 120 and 122. If desired, an auxiliary air inlet (not shown) may be provided to supply air from the atmosphere to the pump 22. The cylinder 110, piston 108, valves 120 and 122, and piston rod 104 all form a part of a fluid pump which is conventional. Any other suitable fluid pump which operates from a reciprocating shaft could be used. Moreover, the reciprocal motion of shafts 60 could be used to do various kinds of work other than the pumping of fluid, if desired.

Another presently preferred transmission embodiment is illustrated in FIGS. 6 and 7 and generally designated 130. The transmission embodiment 130 works in much the same way as described transmission 30 and comprises three essentially identical shaft 132, 134 and 136. Each of the shafts 132, 134 and 136 is respectively integrally splined or otherwise nonrotatably joined to an elongated gear 138, 140 and 142, respectively. Each shaft 132, 134 and 136 is provided with an exposed groove or keyway 74 helically disposed at the central portion of the shaft, the groove 74 being essentially identical to the groove 74 illustrated in FIG. 2. Also, each of the shafts 132, 134 and 136 is integrally joined to a spring bearing plate 78 against which one end of compression spring 82 abuts, in a manner essentially the same as that previously described in connection with FIG. 2. Each of the shafts 132, 134 and 136 is carried by a support 144 (see FIG. 7), the terminal ends 137 of which are attached by bolts 133 to a base 135. A bearing 146 is interposed between each shaft 132, 134 and 136 and the shaft support 144 so that the respective shafts may be both rotationally and axially displaced. The central portion of each shaft 132, 134 and 136 loosely passes through support 148, the shaft support 148 presenting a radially inwardly directed key (not shown) essentially identical to the key 76 illustrated in FIG. 2. The forward shaft support 148 is fixed to the base 135 by bolts 141 disposed in the terminal ends 143 of the support 148.

The leading end (not shown) of each shaft 132, 134 and 136 is structurally supported in a manner similar to the manner in which previously described shafts 60 are supported so that rotational and axial displacement is readily accommodated and structure against which the other end of spring 82 abuts. A ball-joint connection similar to that illustrated in FIG. 2 may be provided at the one or both ends of each shaft 132, 134 and 136.

A comparatively short driving gear 150 is situated so as to be disposed in the geometrical center between the gears 138, 140 and 142 so that teeth 152 on the driving gear 150 will selectively mesh with teeth 154, 156 and 158 on the gears 138, 140 and 142, respectively. As best illustrated in FIG. 7, the teeth 152 on the driving gear 150 are disposed over essentially two thirds or 240° of the peripheral surface of the gear 150 so that at any given point in time only two of the three gears 138, 140 and 142 will be meshed with the driving gear 150.

The driving gear 150 is nonrotatably joined to and turns with a drive shaft 160 which is rotatably carried at the forward end of the shaft 160 by the upper end 157 of an L-shaped support 162, secured to the base 135 at the leg 161 by bolt 163, and at the rearward end by the upper end 159 of support 164, similarly secured at the leg 165 by bolt 167 to the base 135. The terminal end 166 of the drive shft 160 is integral with a diametrally larger sprocket 168 presenting radially extending teeth 169 which are, in turn, engaged by a driving chain 170. The driving chain is displaced by a conventional prime mover (not shown) and causes the drive shaft 160 and driving gear 150 to rotate, the driving gear 150 serially first rotating and then releasing each of the gears 138, 140 and 142. As the gears 138, 140 and 142 are serially engaged by the rotating teeth 152 of the drive gear 150, the gears will, in seriatim, cause the shafts 132, 134 and 136, respectively, to jointly rotate and axially advance toward the right as viewed in the figures along a path defined by keyway 74 due to the disposition of the key (not shown) in the keyway 74. The forward displacement (toward the right) of the shafts 132, 134 and 136 will serially terminate when the smooth exterior 172 of the driving gear 150 becomes adjacent the gear in question, allowing the compression spring 82 to return each of the shafts 132, 134 and 136 to the leftmost position. The reciprocation of shafts 132, 134 and 136 may be used to perform various types of work or the like.

If desired, the shaft embodiment 798 illustrated in FIG. 22 may comprise an extension of the drive shaft 160 for creating reciprocal movement in a manner somewhat similar to the action of shafts 132, 134 and 136. As best shown in FIG. 22, the right end of shaft 160 may be welded or otherwise nonrotatably secured to a hollow casing 800 which is preferably square in cross section. The hollow casing 800 is interiorly provided with bearing plates 802 adjacent each of the interior wall surfaces of the casing 800. The bearing plates 802 are each provided with a plurality of spaced and suitably sized apertures 804 within which ball bearings 806 are disposed. Such ball bearings are usually covered up with a lubricant. The ball bearings 806, because the thickness of the plates 802 is carefully selected, impinge upon the adjacent interior wall of the casing 800 and the adjacent exterior surface of a solid square shaft 808 which is sized to be telescopically disposed within the casing 800 and the plates 802, the free end 810 of the shaft 808 being axially movable back and forth within the casing 800 on ball bearings 806 and restrained from rotational movement relative thereto because of the close tolerance relation of the telescoped portions. The right end 812 of the shaft 808 is welded or otherwise rigidly secured to a circular shaft extension 814 having a continuous forward and reverse helical keyway 816 of the type illustrated in FIGS. 8 and 9, which is disposed in the periphery of shaft 814. Currently, about four revolutions in all such keyways of this invention per one-half of a shaft stroke is preferred. The keyway 816 is adapted to receive a rigidly positioned key (not shown) in the shaft support 148 in a manner as heretofore explained.

Thus, as the drive shaft 160 rotates, casing 800 will rotate therewith simultaneously causing shafts 808 and 814 to likewise rotate. The key (not shown) disposed within keyway 816 will cause shaft 814 and shaft 808 to also axially reciprocate between the extreme ends of the length of the keyway 816. Axial reciprocation of the shaft 808 within the casing 800 is powered in both directions by the rotation of shaft 160, the reciprocation smoothly accommodated by bearings 806 so that the reciprocal motion imparted in the shaft 814 occurs with a minimum amount of frictional resistance.

FIG. 8 illustrates still another presently preferred transmission embodiment, generally designated 180. Transmission 180 operates in like manner and is similar in many respects to the embodiment of FIG. 2, like parts being correspondingly designated with like numbers without further commentary. Transmission 180 differs from transmission 30 in that the driving wheel or cylinder 182 is hollow and the interior comprises a substantially smooth surface 190 extending over the entire internal circumference of the driving cylinder 182.

Three substantially identical reciprocable shafts 192 are disposed eccentrically within the hollow of the driving cylinder 182 and each is nonrotatably joined to a peripherally smooth wheel or roller 196. Each roller 196 is sized so that the outer periphery 198 will compressively engage the smooth surface 190 of the cylinder 182, the wheel 196 being preferably formed of rubber or like material so that a high friction surface contact will exist between the periphery 198 of each roller and the adjacent surface 190.

The intermediate portion 200 of each shaft 192 is provided with a comparatively wide endless keyway or groove 202 into which a tongue or key 204, integral with the support 64, projects. The key 204 projects radially inwardly at an aperture 206 in the support 64 through which the shaft 192 loosely passes. The key 204 and keyway 202 are shown as being wider than key 76 and keyway 74.

The keyway 202 (FIG. 9) located in the exposed periphery of the shaft 192 traverses an endless path comprising a forwardly directed portion 208 which helically winds 360 degrees around the periphery of the intermediate portion 200 of the shaft and a rearwardly directed portion 210, continuous with the portion 208, which helically winds in the opposite direction through 360 degrees around the periphery of the shaft and crosses the portion 208 at 209 (FIG. 9). As shown in FIG. 9, the forwardly directed portion 208 and the rearwardly directed portion 210 of the groove 202 essentially trace a figure 8 when considered from a plan view position.

In the operation of the embodiment of FIG. 8, the driving cylinder 182 is rotated by the force of driving belt 56 upon the integrally connected annular collar, the belt 56 being driven by a prime mover (not shown). Rotation of the driving cylinder 182 causes the three wheels 196 to likewise rotate because of the friction engagement between the periphery 198 thereof and the surface 190 of the driving cylinder 182. As each shaft 192 rotates, the key 204 in the keyway 202 will cause the shaft 192 and attached roller 196 to be axially displaced to and fro between the position illustrated in solid lines in the figure to the dotted line position. Thus, each shaft in turn will traverse a path defined by the keyway 202. The reciprocating motion of the shafts 192 can be suitably used to perform work.

Reference is now made to FIGS. 10–12 wherein the previously mentioned fluid motor, generally designated 26, is illustrated in detail. The fluid motor 26 comprises a cylindrical housing 222 which is internally hollow, presenting a substantially smooth interior surface 224 (FIG. 11). The cylindrical housing 222 is exteriorly threaded at 234 and 236 adjacent each end 226 and 228 so as to receive end caps 230 and 232, respectively, which are exteriorly shaped in the form of a regular hexagon and comprise an interior bore to present threads 234 and 236 which mate with the threads 227 and 229 in the respective ends 226 and 228 of the cylinder 222. Each end cap 230 and 232 is provided with a centrally disposed outwardly projecting boss 238 and 240 each having a central bore 242 and 244 which is internally threaded at the outwardmost portion 246 and 248, respectively. An intermediate portion 250 and 252 of the bores 242 and 244 presents a substantially smooth surface and each intermediate portion 254 and 256 is of reduced diametral size. The reduced portions 254 and 256 and the intermediate portions 250 and 252 define a seat 258 and 260 for the respective fluid seals 262 and 264. The fluid seals 262 and 264 are normally held in place adjacent the seat 258 and 260, respectively, by essentially identical seal retainers 266 and 267, the retainer 267 being shown in dotted lines in FIG. 11. The seal retainers 266 and 267 each have a hexagonally shaped peripheral flange 268 and a diametrically reduced shank 270 which is exteriorly threaded to be received by the outwardmost portion of the bore 246 and 248. The seal retainers each have a central axially disposed aperture 272 which, when the seal retainers 266 and 267 are in threaded engagement with the outwardmost portions 246 and 248 of the central bores 242 and 244, are in axial alignment with the reduced diametral portions 254 and 256. When the retainers 267 and 266 are tightened upon the seals 262 and 264, respectively, the seals will spread to prevent escape of fluid from the cylindrical housing 222.

A reciprocable shaft 274 is concentrically disposed within the cylindrical housing 222 with each end 276 of the shaft 274 extending through the reduced diametral portions 254 and 256, the seals 262 and 264 and the aperture 272. Each exposed end 276 and 278 of the shaft 274 is integrally connected to a coupling eyelet 280, such as by threaded engagement.

The shaft 274 is nonrotatably fastened to a spool 282 at a location essentially one-half the axial length of the shaft. The spool 282 is cylindrical in shape and disposed within the cylindrical housing 222 so that the external periphery 284 of the spool 282 is spaced slightly from the interior surface 224 of the cylindrical housing 222. The opposing faces 286 and 288 of the spool 282 present outwardly projecting bosses 290 and 292. The bosses 290 and 292 are diametrically reduced in size and are concentric about the shaft 274.

The spool 282 presents a pair of seal rings 294 and 296 which are disposed around the entire circumferential periphery 284 of the spool 282. The seal rings 294 and 296 are respectively sized so as to form a fluid seal between the periphery 284 of the spool 282 and the interior surface 224 of the cylindrical housing 222. The seal rings 294 and 296 are preferably elastomeric O-rings or other suitable seals material which develop a minimal amount of friction with the interior surface 224 of the cylinder 222 so that the spool 282 may be satisfactorily axially displaced within the cylindrical housing 222.

The bosses 290 and 292 are adapted to serially engage displaceable sleeve valves 298 and 300, respectively, as the shaft 274 and spool 282 jointly reciprocate within the cylindrical housing 222. Each displaceable sleeve valve 298 and 300 is an essentially hollow cylinder having an open outward end 302 and 304 and an inward end 306 and 308, respectively, which terminate in shoulders 310 and 312. The shoulders 310 and 312, respectively, define diametrically reduced bores 314 and 316 which allow fluid communication between the hollow 318 and 320 of the displaceable sleeves 298 and 300, respectively, with the interior of the cylindrical housing 222. The shoulders 310 and 312 have inwardly directed lips 309 and 311 which are provided with annular resilient impact cushions 322 and 324 which are generally U-shaped in cross-sectional configuration. The impact cushions 322 and 324 cooperate with the lips 309 and 311 to form an impact surface 326 and 328 on the displaceable sleeves 298 and 300, respectively. Thus, when the boss or abutment surface 290 moves to the left and engages the impact surface 326, the valve 298 will be displaced left thereby closing the left fluid egress port and opening the left fluid ingress port. The valve 300 likewise shifts left closing the right ingress port and opening the right egress port. A similar but opposite result occurs when the abutment surface or boss 292 is displaced rightward against the impact surface 328.

The external circumferential surface 330 and 332 of sleeves 298 and 300 are disposed in close tolerance relation with the internal surface 224 of the cylindrical housing 222 so that the displaceable sleeves 298 and 300 are movable therein. Resilient annular seals 334 and 336 are disposed in grooves in the circumferential surface 330 of displaceable sleeve 298 at the respective end edges of the surface 330. Similarly, seals 338 and 340, which are substantially identical to the seals 334 and 336, are disposed in grooves in the circumferential surface 332 of the displaceable sleeve 300 at the respective end edges of the surface 332. While the seals 334, 336, 338 and 340 accommodate axial displacement of the sleeves 298 and 300, respectively, the mentioned seals substantially preclude passage of air or "blow by" between the surfaces 330 and 332 of the respective sleeves 298 and 300 and the interior surface 224 of the cylindrical housing 222.

The displaceable sleeves 298 and 300 are respectively situated adjacent the corresponding ends 226 and 228 of the cylindrical housing 222. The cylindrical housing 222 is provided with transverse ports comprising exhaust or egress ports 342 and 344 respectively located adjacent the ends 226 and 228 thereof. The exhaust ports 342 and 344 have a diametrically enlarged interiorly threaded portion 346 and 348 which are adapted to receive the threaded shank 350 and 352 of respective fittings 354 and 356. The fittings 354 and 356 have diametrically enlarged generally hexagonally shaped flanges 358 and 360 which may be selectively engaged by a conventional wrench or the like for correct placement of the fittings 354 and 356. The fittings 354 and 356 are integrally connected in a conventional air-tight manner to air-return tube 362 and 364 which communicate with the return pipe 28 (FIG. 1). Clearly, the exhaust ports 342 and 344 could be open to the atmosphere.

The cylindrical housing 222 is further provided with intake or ingress ports 366 and 368 which are located in the cylindrical housing 222 diametrically opposite but slightly axially offset from the exhaust ports 342 and 344 a predetermined axial distance inward of the ends 226 and 228 of the housing 222. The predetermined distance is slightly greater in magnitude than the axial length of the circumferential surface 330 and 332 of the displaceable sleeves 298 and 300 for a purpose which will be hereinafter more fully described. The ports 336 and 338 have diametrically enlarged portions 370 and 372 which are internally threaded to receive the exteriorly threaded shank portion 374 and 376 of fittings 378 and 380. The fittings 378 and 380 are provided with diametrically enlarged flanges 382 and 384 which are generally hexagonal in shape to be received by a conventional wrench for the purposes of attaching the fittings 378 and 380 in the manner previously mentioned. The fittings 378 and 380 are integrally connected to intake tubes 386 and 388 which are in fluid communication with the outlet tube 118 in the pump 22 (FIG. 1).

The displaceable sleeves 298 and 300 are firmly joined to radially projecting diametrically opposed pins 390, 392 and 394, 396, respectively (see FIG. 10). Since each of the pins 390, 392, 394 and 396 is substantially similar in construction and function, only the structure of pin 390 will be described. Pin 390 comprises a central portion 398 and terminal portions 400 and 402 having reduced diametral dimension. The extreme ends 404 and 406 are exteriorly threaded so that interiorly threaded hex nuts 408 and 410 may be threadedly received thereby. The diametrically reduced terminal portion 400 is adapted to project through an aperture 412 in the displaceable sleeve 298.

The hex nut 408 is tightened upon the threaded extreme end 404 of the pin 390 until the one end 414 of the central portion 398 tightly abuts the exterior surface 330 of the displaceable sleeve 298 and so that axial movement of the pin 390 is substantially precluded. The reduced diametral terminal end 402 is adapted to be received by a transverse aperture 416 located adjacent the trailing end 418 of a connecting rod 420. The hex nut 410 is threadedly tightened upon the extreme end 406 of the pin 390 to tightly secure the connecting rod 420 against the abutment surface 422 comprising the other end of the central portion 398 of the pin 390.

The connecting rod 420 is substantially similarly attached to the pin 396 so that the distance between the displaceable sleeve 298 and the displaceable sleeve 300 is fixed. Another connecting rod 424 is attached in the manner previously mentioned to the pins 392 and 394 to cooperate with the connecting rod 420 in maintaining a constant axial separation of the sleeves 298 and 300. The central portion 398 of each of the pins 390 and 392 is disposed through diametrically opposite axially elongated slots or keyways 426 located adjacent the end 226 of the housing 222. Similarly, the central portion 398 of each of the pins 394 and 396 is disposed through diametrically opposite axially elongated slots 428 located adjacent the end 228 of the housing 222, the slots 426 and 428 having substantially similar axial dimensions.

In the operation of the motor 26, when the displaceable sleeves 298 and 300 are located in the leftmost position defined by the left-hand end 430 and 432 of the slots 426 and 428, respectively, as illustrated in FIGS. 10 and 11, the left exhaust port 342 will be closed, as shown, by the seal 334 at exterior 330 of the displaceable sleeve 298. Similarly, the right intake port 368 will be sealed closed, as shown, by the seal 338 at peripheral surface 332 of the displaceable sleeve 330.

In this first position, compressed air will thus be admitted through the intake port 366 in the direction illustrated by the solid arrow 434 causing a pressure to be exerted upon the left surface 286 of the spool 282. The pressure will displace the spool and shaft 274 relative to the housing 222 in the direction of arrow 246, while the sleeve valves 298 and 300 remain in the described position.

The displacement of the spool 282 and shaft 274 to the right will ultimately cause the abutment shoulder 292 on the face 288 of the spool 282 to strike the impact cushion surface 328 causing axial displacement toward the right of the displaceable, integrally fastened sleeves 298 and 300 a distance limited by slots 426 and 428. Sleeve displacement ends when pins 392, 394, 396 and 398 engage the right end of the slots 426 and 428.

During such axial displacement of the spool 282 in the direction of arrow 436, air within the cylindrical housing 222 adjacent the face 288 is communicated through the bore 316 and hollow 320 of the sleeve 300 and, thereafter, through the outlet port 344 and exhaust tube 364 in the direction of arrow 442.

When the sleeves 298 and 300 are axially displaced to the right as mentioned, the exhaust port 344 will be closed by seal 340 at the periphery 332 of the sleeve 300 and intake port 368 will be opened. Likewise, the intake port 366 will be closed by the seal 336 and exhaust port 342 will be opened. Thus, fluid pressure will be impressed upon surface 288 of the spool 282 causing the spool 282 and shaft 274 to be jointly axially displaced to the left and air within the cylindrical housing 222 adjacent the surface 286 of the spool 282 will be displaced through the bore 314, the hollow 318 of the sleeve 298 and out through the fitting 354 and attached tube 362 in the direction of the broken line arrow 444.

Forceful displacement of the spool 282 toward the left will ultimately cause the abutment shoulder 290 to strike the impact surface 326 thereby returning the sleeves 298 and 300 to the initial position. It should be apparent that as long as air pressure is communicated through tubes 386 and 388, the spool 282 and integral shaft 274 will rapidly and continuously reciprocate in a continuous manner, the sleeve valves 298 and 300 being jointly serially displaced from one extreme axial location to another to control the direction of pressure acting on the spool 282.

Reference is now made to FIGS. 13 and 14 which illustrate one presently preferred structure which may be used to convert the reciprocal motion of the shaft 274 to rotary motion. Of course, the reciprocal motion could be used in other ways. The described air motor 26 is carried by and firmly held in the position of FIG. 13 by an exteriorly disposed annular collar 450. The collar 450 is attached to the cylindrical housing 222 essentially central thereof in a conventional manner, such as by clamping, welding or the like. The collar 450 is provided with radially projecting pins 452 and 454 (FIG. 14) which are journaled in apertures 456 existing in bracket supports 458 and 460. The bracket supports 458 and 460 are fixed at the lower flanges 459 and 461 thereof, such as by welding, to a rigid base. The rods 452 and 454 are pivotal within the apertures 456 in the bracket supports 458 and 460. The rods 452 and 454 are preferably restrained from axial displacement out of journaled relation with apertures 456 such as, for example, by enlarged ends (not shown).

The end 276 of the shaft 274 is pivotally attached at the eyelet 280 thereof to an upper pawl or detent 462. The pawl 462 has a clevis 464 at the proximal end 466 thereof into which the eyelet 280 is inserted and retained by a rivet or pin 468 so that the pawl 462 is pivotal relative to the shaft 274. The trailing end 278 of the shaft 274 is also provided with a connecting eyelet 470 which is identical to the described connecting eyelet 280 on the end 278 of the shaft 274. The connecting eyelet 470 is disposed within a clevis 472 comprising the terminal portion of the left arm 474 of a rocker bracket 476.

The rocker bracket 476 has a substantially flat upper edge 478 and a curvilinearly lower edge 480 which tapers toward the ends 482 and 484 to define arms 474 and 475. The bracket 476 is generally uniform in transverse dimension except at a location 486 situated adjacent the upper edge 478 essentially equidistant between ends 482 and 484. At location 486 the bracket 476 presents opposed bosses 488 and 490 which journal upon axles 492 and 494. Axles 492 and 494 are received for pivotal movement within respective bosses 496 and 498, respectively, upon suitable bearings or bushings, as are all journal connections mentioned in this specification.

The arm 475 of the bracket 476 is provided at the terminal end thereof with a clevis (not shown) which is essentially the same though opposite hand as clevis 472 of arm 474 and which is pivotally connected by rivet or pin 500 to lower pawl or detent 502. The distal ends 504 and 506, respectively, of pawls 462 and 502 are forwardly tapered to be received by interdental portions 508 between teeth 516 of a ratchet wheel 510.

The ratchet wheel 510 is non-rotatably connected to an axle 512 which is, in turn, rotatably journaled within two delta-shaped axle supports 514 adjacent the elevated apex 515 of each. Each axle support 514 is provided with bearing or bushing structure (not shown) interposed between the axle support 514 and the axle 512 to minimize friction therebetween. Each axle support may be secured adjacent the lower flange 517 thereof to a suitable base or floor (not shown).

In the operation of the embodiment of FIGS. 13 and 14, the air motor 26 is activated to cause the shaft 274 to reciprocate in a continuous manner as earlier described. When the end 276 of the shaft 274 is in the most extended position illustrated in solid lines in FIG. 13, the tapered end 506 of the pawl 502 will engage an interdental space 508 at the location shown in solid lines in the figure. When the reciprocating shaft 274 moves to the dotted line position shown in FIG. 13, the tapered end 504 of pawl 462 will be retracted clockwise over teeth 516 to the dotted line position shown and the tapered end 506 of the pawl 502 will engage a front surface 520 of the adjacent tooth 516 and drive the ratchet wheel 510 counterclockwise in the direction of arrow 522 until the pawl 502 advances from the solid line to the dotted line position in the figure. During the movement from the dotted to the solid line position, the housing 222 will rock slightly clockwise. The housing 222 will rock slightly counterclockwise when movement in the reverse direction occurs.

Next, the shaft 274 will be axially displaced to the initial solid line position of FIG. 13. During this movement, the pawl or detent 502 will be retracted clockwise over teeth 516 and the pawl 462 will engage the adjacent interdental space 508 and front surface 520 to continue the advancement of the ratchet wheel 510 counterclockwise in the direction of arrow 522. The mentioned back and forth motion is continued so long as it is desired to drive wheel 510. Thus, it is apparent that as she shaft 274 reciprocates, the rocker bracket 476 will also move from the solid line to the dotted line position and back again so that the pawl 462 and 502 alternately and continuously rotate the ratchet wheel 510 in the direction of arrow 522.

Reference is now made to FIGS. 15–18 wherein another embodiment for converting the reciprocal motion in the shaft 274 to rotary motion is illustrated. The portion of the structure illustrated in FIG. 15 which is substantially the same as the structure illustrated in FIG. 13 is correspondingly numbered and will not again be described.

In the embodiment of FIGS. 15–18, generally designated 523, the shaft 274 of the air motor 26 is pivotally connected at the end 276 thereof to an upper arm 524 disposed adjacent a cylindrical wheel 526 which has a substantially smooth circumferential surface 528. The surface 528, preferably, is a material which will provide a high frictional resistance. The rocker bracket 476 is pivotally connected to lower arm 530, the arms 524 and 530 preferably being connected to the bracket 476 in substantially the same manner that the pawls 462 and 502 were connected to the rocker bracket 476 in the embodiment of FIGS. 13 and 14. The arms 524 and 530 each presents driving structure 532 and 534 for displacing the wheel 526, each driving structure being substantially similar to the other and, therefore, only one will be described. Referring more particularly to FIG. 16, the wheel driving structure 532 comprises opposed generally triangularly-shaped guide plates 536 and 538 which are integrally united to the arm 524 at 540 and 542, such as by welding or the like. The width of the arm 524 is only slightly greater than the width of the wheel 526 so that the guide plates 536 and 538 are disposed juxtaposed and in movable relation with a portion of each opposed flat face 544 and 546 of the wheel 526. Although the guide plates 536 and 538 are illustrated as having a triangular shape, clearly any suitably shaped guide plates could be used. The guide plates 536 and 538 are provided with elongated slots 548 (FIGS. 17 and 18) which are transversely aligned with each other and axially aligned with the arm 524.

One transversely-extending axle 552 and 554 is disposed movably within each of the two slots 548, the axles 552 and 554 each terminating in diametrically enlarged flange or swedged end 556 and 558.

Each axle 552 and 554 is provided with disc-shaped flanges 560 and 562 which are integral with the shaft 550 and spaced from the ends 552 and 544, respectively, to prevent excessive axial travel of a cylindrical engaging drum or roller 564, which is centrally disposed between the guides 536 and 538. The roller 564 is rotatably joined to the axles 552 and 554 for independent rotation relative thereto, the roller 564 being continuously urged toward a contiguous relation with the peripheral surface 528 of the wheel 526 by springs 566 and 568. The springs 566 and 568 are provided with an elongated forwardly disposed looped end 570 and 572, respectively, which fit around the adjacent axle just inside of the terminal swedged ends 556 and 558. The rearward end 574 and 576 are respectively looped around respective studs 578 and 580 which are immovably fastened to the guides 536 and 538. The studs 578 and 580 are also provided with terminal diametrically enlarged swedged ends 582 and 584 which prevent the rearward ends 574 and 576 of the springs 566 and 568 from becoming inadvertently disengaged from the studs 578 and 580.

In the operation of the embodiment of FIGS. 15–18, your attention is particularly directed to FIGS. 17 and 18. With reference particularly to FIG. 17, when the arm 524 is retracted by fluid motor 26 in the manner heretofore described in the direction of arrow 586, the roller 564 is retained against the surface 528 of the wheel 526 by force of the springs 566 and 568. The guide 538 follows the arm 524 outwardly away from the wheel 526, the initial position being illustrated by dotted line 588 (FIG. 17). The lateral distance which the guide 538 moves relative to the wheel 526 is determined by the length of the axial slot 548. As the arm 524 moves in the direction of arrow 586, the rollers 564 will roll clockwise along the periphery 528 of the wheel 526 in the direction of arrow 590 (FIG. 17). At the same time driving structure 534 is turning the wheel 526 counterclockwise in a manner hereinafter explained in connection with structure 532.

When the arm 524 is caused to be oppositely displaced so as to move in the direction of arrow 592 (FIG. 18) by action of the shaft 274 responsive to the urging of fluid motor 26, the arm 524 and integral guide 538 will advance relative to the surface 528 of the wheel 526 until the sloping terminal end 594 of the arm 524 engages the roller 564. The roller 564 will then be wedged between surfaces 538 and 594 and will cease to rotate relative to the wheel 526. In this position, as the roller 564 is further displaced by the arm 524 in the direction of arrow 592, the wheel 526, being firmly engaged by the roller 564, will continue to advance counterclockwise in the direction of arrows 596 and 598. At the same time arm 530 and driving structure 534 will be retracted clockwise by force of fluid motor 26. Thus, the rollers of structures 530 and 532 will be alternately urged against the periphery 528 of the wheel 426 in a continuous series to cause the wheel 526 to continuously rotate counterclockwise in the direction of arrow 598 (FIG. 15).

Referring now to FIGS. 19–21, a presently preferred governor embodiment is schematically illustrated which may be used to regulate the rate of rotation of either wheel 510 or 526 by controlling the air which reaches the motor illustrated in FIGS. 10–12. The governor, generally designated 606, comprises an inner support spindle 608 which is welded or otherwise permanently attached to a rigid base 610. The spindle 608 has a central hollow interior 612 which opens at both ends and which is an axial alignment with an aperture 614 in the base 610. The aperture 614 is provided with a bearing 616 through which the shaft 618 is disposed for axial and rotational movement. The lower portion 620 of the spindle 608 terminates in a radially projecting flange 622. The fillet surface 624 existing between the flange 622 and the lower portion 620 of the spindle 608 comprises one bearing race which receives ball bearings 626.

The upper portion 628 of the spindle 608 is provided with an annular groove 630 which opens upwardly at the extreme outer circumferential edge of the spindle 608. The annular groove 630 functions as a bearing race for ball bearings 632.

An exterior sleeve 634 is essentially cylindrical in shape and centrally hollow at 636, the inside diametral dimension being somewhat larger than the outside diametral dimension of the spindle 608. The sleeve 634 is open at the bottom end 638 so that the spindle 608 may be disposed in the hollow 636 of the sleeve 634. The bottom end 638 terminates in an arcuately configured outwardly disposed lip 640, the inner surface 642 of which is similar in size and dimension and opposite in orientation to the fillet 624 comprising part of the spindle 608. Thus, the inner surface 642 of the arcuate lip 640 comprises an upper bearing race for the ball bearings 626. The top end 644 of the sleeve 634 is provided with an inwardly directed annular shoulder 646 forming a portion of the end surface 648. The annular shoulder 646 forms an upper bearing race to cooperate with the lower bearing race 630 to contain ball bearings 632.

The end surface 648 is provided with a centrally located aperture 650 through which the shaft 618 passes. If desired, a bearing 562 may be located within the aperture 650 to surround the shaft 618.

The sleeve 634 is integrally connected at the face 646 to parallel, upwardly projecting plates 654 and 656 which have a general shape of an inverted triangle presenting a generally horizontal upper surface 658 and downwardly, inwardly tapering sides 660 and 662. A pin 664 is disposed between the plates 654 and 656 adjacent each upper corner 666 thereof, only one of which is illustrated in FIG. 19. The pin 664 has an enlarged rounded head 668 (see FIG. 20) and is maintained in position between the plates 654 and 656 by a cotter pin 670 or the like.

An enlarged, essentially circular end 672 of an integral generally tangentially extending lever 675 is pivotally carried upon the pin 664. The end 672 is provided with interdental spaces 676 over a substantial part of the circumference thereof, between teeth 678. The lever 674 which is integral with the end 672 in an essentially tangential disposition, terminates in its outer free end 680 in a weighted spherical ball 682.

The teeth 678 in the end 672 are adapted to mesh with teeth 684 comprising the periphery of a pinion gear 686. The pinion gear 686 is rotatably disposed upon a pin 688 which is disposed between plates 654 and 656 in a manner substantially similar to that of pin 664 previously mentioned. The pin 668 has an enlarged rounded head 690 and is prevented from being axially displaced out of the plates 654 and 656 by cotter pin 692. It should be appreciated that pinion gear 687, located diametrally opposite pinion 686, is substantially the same as pinion gear gear 686 in structure, suspension and function and, therefore, need not be separately described.

Teeth 684 are adapted to mesh with the rack-end 694 of the shaft 618. The rack-end 694 presents opposed teeth 696. The opposed outwardly projecting teeth 696 are oriented parallel to the planes containing the plates 654 and 656 and are continuously restrained in that orientation because of the close tolerance between the smooth sides 698 of the rack 694 and the plates 654 and 656.

Thus, as the sleeve 634 and parallel plates 654 and 656 are rotated relative to the spindle 608, the shaft 618 will be caused to jointly rotate therewith. The sleeve 634 is exteriorly connected, such as by welding, to an annular collar 776 which presents an outwardly directed V-shaped channel 778. The channel 778 receives an endless drive belt, such as a V-belt. The V-belt also engages a pulley or the like (not shown) which is integrally connected to the axle 512 (FIGS. 13 and 15). Rotation of axle 512 causes the sleeve 634 to be rotated upon the spindle 608.

The terminal end 700 of the shaft 618 is a diametrically enlarged flange, the upper surface 702 of which comprises a bottom portion of a bearing race for ball bearings 704. The terminal flange 700 is carried generally within a cylindrically shaped pivot 706 which is open at 708 to allow for free rotation of the shaft 618 therein. The opening 708 defines an annular shoulder 710 comprising an upper bearing race for the ball bearings 704. It is, therefore, apparent that the shaft 618 is independently rotatable within the pivot 706.

The pivot 706 is provided with a downwardly extending tab 712 which is pivotally connected at 714 to arm 716. The arm 716 is in turn pivotally connected adjacent the end 718 of a rocker arm 720. The rocker arm 720 is pivotally connected to a rigid, stationary support 722 at 724 essentially one-half the axial length of the rocker arm 720. The other end 726 of the rocker arm 720 is provided with an axially disposed elongated slot 728 which carries a pin 730. The pin 730 is integral with a valve rod 732 projecting in a direction perpendicular to the axis of the rod 732 adjacent the end 734 thereof. The pin 730 is freely displaceable within the slot 728 but is restrained within the slot 728 by a diametrically enlarged terminal flange (not shown).

The valve rod 732 forms an integral part of a diametrally enlarged cylindrically shaped valve 736. The valve 736, best illustrated in FIGS. 19 and 21, is provided with an aperture 738 disposed essentially normal to the axis of the cylindrical valve 736 adjacent the leading end 740 thereof.

As best illustrated in FIG. 21, the valve 736 is disposed within a cylindrical valve seat 742 in a close tolerance relation accommodating axial displacement of the valve 736 within the interior 744 of the valve seat 742 while at the same time substantially obviating air leakage between the exterior surface 746 of the valve 736 and the interior surface 744 of the valve seat 742. A small aperture or bleeder 748 provides for free air communication into and out of the interior 744 of the valve seat 742 as the valve 736 strokes up and down within the valve seat 742.

The exterior sides 750 and 752 present outwardly extending, diametrally opposed bosses 754 and 756, respectively. Each boss 754 and 756 comprises an axial bore 758 and 760, respectively, which is in communication with coaxial bores 762 and 764. Each bore 762 and 764 has a reduced diametral dimension which, with the bores 758 and 760, define an annular abutment surface 766 and 768, respectively. The valve and seat are adapted to be interposed between portions of the intake tubes or intake air supply to the air motor illustrated in FIGS. 10–12. Each of the bores 758 and 760 is adapted to receive ends 770 and 772 which comprise segments of the intake tube 25 (FIG. 1). The ends 770 and 772 are connected to the valve seat 742 in a press-fit relation adjacent the abutment surface 766 and 768 and are disposed coaxially one with another and parallel to the axis of the transverse aperture 738.

In the operation of the governor embodiment of FIGS. 19–21, the outer sleeve 634 and the shaft 618 are caused to revolve upon the spindle 608 at a rate proportional to the angular velocity of axle 512 (FIGS. 13 or 15) by V-belt 774 which connects the axle 512 and the housing 634.

As the housing 634 rotates around the spindle 608, the weighted balls 682 will be thrown outward from the solid line toward the dotted line position of FIG. 19 by centrifugal force. Arcuate displacement of the lever 674 will cause the engaged teeth 678 of the end 672 to rotate counterclockwise and to in turn rotate teeth 684 on pinion gear 686 in a clockwise direction. The engagement of the teeth 684 with the rack 694 will correspondingly cause the rack 694 to be axially displaced from the solid line to the dotted line position in FIG. 19. Axial displacement of the shaft 618 will cause the rocker arm to move from the position shown in the solid lines to the dotted line position so that the valve cylinder 736 will be displaved downwardly in the seat 742, the aperture 638 moving partially out of axial alignment of the tube 386. Therefore, air pressure being communicated through the tube 25 to drive the air motor 26 (FIGS. 10–12) will be restricted thereby proportionately decreasing the speed of the air motor 26. Thus, the governor 606 regulates the speed on the air motor 26 by selectively controlling the rate at which air under pressure is communicated to the air motor 26 through the intake tube 25.

The invention may be embodied in other specific forms without departing from the spirit or essential characteristics thereof. The present embodiments are, therefore, to be considered in all respects as illustrative and not restrictive, the scope of the invention being indicated by the appended claims rather than by the foregoing description, and all changes which come within the meaning and range of equivalency of the claims are therefore to be embraced therein.

What is claimed and desired to be secured by United States Letters Patent is:

1. An apparatus for converting rotation to axial reciprocation comprising a plurality of spaced rotatable and reciprocable shafts, each shaft being driven by common rotatable drive structure and supported for rotational and reciprocal motion and each shaft being provided with generally helical guide means disposed along the periphery thereof and each shaft comprising means rotatably associated with and powered by the drive structure for transmitting the rotation of the drive structure to all shafts through only part of each revolution of the drive structure, stationary guide structure disposed in male-female mating relation with the generally helical guide means of each shaft to cause the rotation of the drive structure to both rotate and axially displace all shafts in one direction during the time interval while each shaft is powered by the drive structure, the mentioned composite motion of each shaft corresponding to the helical path defined by the guide means. and resilient biasing structure for accommodating helical return of each shaft along the path defined by the guide means thereof during the time interval when the shaft is not powered by the drive structure.

2. An apparatus as defined in claim 1 wherein said plurality of shafts comprise an array which generally surrounds at least part of the drive structure disposed central of the array, each shaft being helically displaced during the time when powered by the drive structure and thereafter returned along the same helical path by the resilient biasing structure, the mentioned displacement and return cycle of any one shaft being in time-spaced relation to the displacement and return cycle of any other shaft.

3. An apparatus as defined in claim 1 wherein the drive structure comprises drive gear means having teeth traversing only part of the 360° thereof and wherein the means of each shaft which are powered by the drive structure comprise gear means, the teeth of which mesh with those of the drive gear means only during the time when powered by the drive structure.

4. An apparatus as defined in claim 1 wherein said resilient biasing structure comprises compression spring means which exert an axial force upon each shaft in a direction opposite the axial displacement thereof when powered by the drive structure.

5. An apparatus as defined in claim 1 wherein the drive structure comprises a hollow rotatable cylinder adapted to be rotated by a prime mover, the cylinder being internally rotatably associated during only part of each revolution of the cylinder with roller means nonrotatably carried by each shaft.

6. An apparatus as defined in claim 5 wherein said cylinder comprises axially-aligned gear teeth disposed over less than the entire internal circumferential surface of the cylinder and wherein the roller means each comprise a gear having teeth which mesh with the teeth of the cylinder during part of each revolution thereof to power the associated shaft, the return of each shaft occurring while the associated gear is not in mesh with the cylinder.

7. An apparatus as defined in claim 1 wherein said drive structure comprises a power-driven primary gear presenting externally-spaced radially-projecting gear teeth disposed over all except a selected circumferential increment of distance and wherein each means powered by the drive structure comprises at least one secondary gear provided with gear teeth adapted to mesh with the teeth of the primary gear and be rotated thereby through the selected circumferential increment of distance.

8. An apparatus as defined in claim 7 wherein the selected circumferential increment of distance comprises essentially one-third the circumference of the primary gear.

9. An apparatus for converting rotational movement of a power input structure to reciprocating axial movement in a shaft comprising a hollow rotatable drum rotated by the power input structure, the drum having a substantially smooth internal surface, an axially displaceable shaft having an integral friction-driven wheel of substantially smaller diameter than the drum disposed interior of and in friction-contact with the internal surface of the drum so that when the drum rotates the shaft is rotated in he same direction and at a faster rate of speed, the shaft further comprising interconnected oppositely-directed helical means defining an endless path in the form of a figure eight along the periphery of the shaft, a fixed guide structure disposed in relative slideable coupled relation with the helical means to cause the shaft to continuously axially advance and retract during the rotation cycle thereof caused by the rotation of the drum.

References Cited
UNITED STATES PATENTS 2,352,396   6/1944   Maltby _____ 74—22
3,388,603   6/1968   Clark _____ 74—57

MILTON KAUFMAN, Primary Examiner

U.S. Cl. X.R.

74—22, 57